United States Patent [19]

Dupree et al.

[11] 3,927,463
[45] Dec. 23, 1975

[54] METHOD OF MAKING A CYLINDRICALLY SHAPED, HOLLOW ELECTROFORMING MANDREL

[75] Inventors: Donald G. Dupree, Alta Loma, Calif.; Raymond E. Bailey; Chester H. K. Ling, both of Webster, N.Y.

[73] Assignee: Xerox Corporation, Stamford, Conn.

[22] Filed: July 12, 1974

[21] Appl. No.: 488,138

Related U.S. Application Data

[60] Division of Ser. No. 265,918, June 23, 1972, which is a continuation-in-part of Ser. No. 89,215, Nov. 13, 1970, abandoned.

[52] U.S. Cl. .................... 29/447; 29/458; 29/460; 118/637; 204/6; 204/25; 204/216; 74/241
[51] Int. Cl.² .......................................... B23P 11/02
[58] Field of Search .......... 29/447, 458, 460; 204/9, 204/25, 6, 216; 74/241; 138/140; 118/637

[56] References Cited
UNITED STATES PATENTS

| | | |
|---|---|---|
| 2,274,961 | 3/1942 | Horger .................................. 29/458 |
| 2,372,665 | 4/1945 | Egli et al. ............................. 204/25 |
| 2,647,847 | 8/1953 | Black et al. ........................... 29/447 |
| 2,768,433 | 10/1956 | O'Donnell ............................. 29/447 |
| 3,098,285 | 7/1963 | Kelzenberg et al. ............... 29/447 X |
| 3,451,903 | 6/1969 | Matsuoka ............................. 204/25 |
| 3,461,046 | 8/1969 | Clancy ............................. 204/216 X |
| 3,616,520 | 11/1971 | Bucalo ................................ 204/9 X |
| 3,633,259 | 1/1972 | Nikanen ........................... 29/447 X |

Primary Examiner—Charlie T. Moon

[57] ABSTRACT

A cylindrically shaped hollow mandrel is disclosed which is suitable in an electroforming process used for the production of an endless seamless nickel xerographic belt. The mandrel set forth comprises a metal core member with a thin removable metal sleeve having a thickness between about 10 and 60 mils which is fitted over said core member to provide a surface for electroforming of the nickel belt. Mandrels disclosed in the present invention have the advantage of a longer lifetime of use in a continuous electroforming process because of the replaceable nature of the metal sleeve.

7 Claims, 1 Drawing Figure

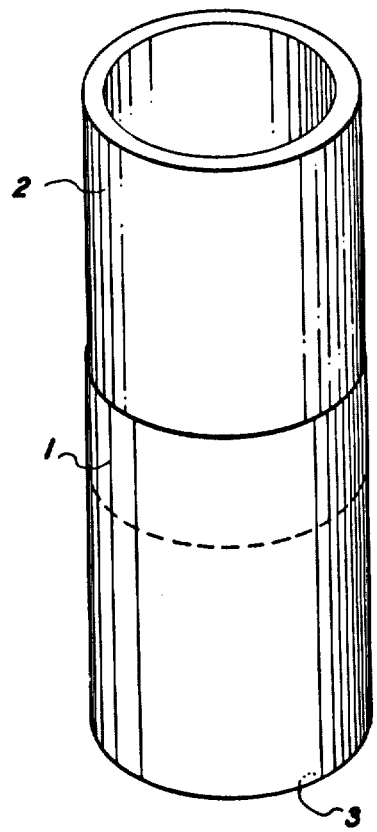

METHOD OF MAKING A CYLINDRICALLY SHAPED, HOLLOW ELECTROFORMING MANDREL

This is a division, of application Ser. No. 265,918, filed June 23, 1972, which is a continuation-in-part of our copending application U.S. Ser. No. 89,215, filed Nov. 13, 1970, now abandoned.

BACKGROUND OF THE INVENTION

This invention relates to electroforming mandrels. More particularly, this invention relates to a cylindrical electroforming mandrel having a removable thin wall sleeve fitted thereover which is especially useful for the electroforming of a nickel xerographic substrate.

In the usual practice of xerography, a latent electrostatic image of an object is formed on a recording medium or substrate called a xerographic plate. The xerographic plate may in turn comprise a thin layer of photoconductive insulating material, such as selenium, on a conductive metal backing such as brass or aluminum. The latent electrostatic image formed on the photoconductive material is developed into a powder image which is subsequently transferred to a sheet of paper and affixed thereon to form a permanent print.

It has been previously proposed to utilize as the conductive metal backing portion of the xerographic plate, an endless flexible band, in which case the xerographic plate or substrate has been referred to as a xerographic belt. Examples of some typical xerographic machines and systems in which the latent electrostatic image is formed on a xerographic belt may be found in U.S. Pat. Nos. 3,045,644; 3,415,224 and 3,435,693.

Endless, flexible xerographic belts have been customarily made by joining or welding the ends of a thin strip of brass to produce an endless belt. The seam produced by joining or welding, however, has the disadvantage of reducing the overall strength and lifetime of the belt as well as requiring indexing of the printing cycle of the machine in which the endless belt is used. Indexing of the printing cycle is necessary to prevent the electrostatic image from being formed on that portion of the belt where the seam is located.

In U.S. patent application Ser. No. 250,894, filed May 8, 1972, now U.S. Pat. No. 3,799,859, entitled "Electroforming Process" (D/3768) and Ser. No. 251,042, Filed May 8, 1972, now abandoned, entitled "Electroforming Apparatus" (D/3769, disclosure is made of an endless, seamless flexible belt suitable as a xerographic substrate. This endless seamless belt is made by an electroforming process which results in electrodeposition of a suitable metal such as nickel on the surficial portion of a cylindrically shaped mandrel. In the electroforming process disclosed in this application the mandrel is suspended in an electroplating solution and rotated therein, thus depositing a uniform thickness of metal on the surface of the mandrel. By expansion and contraction of the mandrel during alternate heating and cooling steps, the deposited nickel layer may be removed off the mandrel, since the mandrel employed has a different coefficient of expansion than the deposited nickel layer.

Hitherto, the mandrels used for this purpose have been fabricated by coating a cylindrical aluminum forging first with various metallic electrodeposits for adhesion and then a top layer of chromium which is ground and polished to achieve the desired dimensions and surface finish. It has been found that this technique for making mandrels is slow and expensive and in so many cases the layer of top chromium is pitted thus making it unacceptable as a mandrel for production of a xerographic substrate. Also, it has been found that if the surface of the mandrel becomes damaged during subsequent use, all the coatings must be chemically removed and replaced with new coatings in order to provide a suitable surface for use in a high volume continuous electroforming operation. Thus, commercial usefulness of the electroforming process dictates that the most economical equipment be employed consistent with the desired quality in the final product, and to achieve this goal of economy it is necessary that the mandrel core member have the longest period of life in the process for which it was devised.

In view of the above consideration, it has been found that the objectives of economy, durability and quality could all be achieved by the use of a mandrel which comprises a hollow core member with a removable metal sleeve tightly fitted over the core member. Since the sleeve portion of the mandrel is the surface used for electrodeposition of the nickel belt in the event of damage to the surface, the sleeve may be conveniently replaced while retaining the core member. This allows more economical employment of the mandrel components while at the same time providing mandrel surficial and dimensional characteristics which are needed for electrodeposition of the nickel layer.

Therefore, in the development of a mandrel having a removable sleeve for electrodeposition of a nickel belt, it was unexpectedly found that all the desired objectives of commercial usefulness, reusability and high degree of functionality could be achieved by using a mandrel having not only a removable but a relatively thin wall metal sleeve, with the sleeve having a thickness of between about 10 and 60 mils. It was determined that a mandrel with such a removable sleeve not only still functioned perfectly in the process as would a mandrel without a removable sleeve but had the additional advantages of being more economical, and could be readily fabricated with a core member without any dimensional problems.

With regard to the dimensions of the mandrel, it should be pointed out that the dimensions and tolerances related thereto are directly related to quality of the belt electroformed thereon and its suitability as a xerographic substrate. For example, if a thicker metal sleeve were employed, it would be difficult to make a mandrel having a necessary cylindricity requirements and which is usable in the electroforming proces because of difficulty in achieving conformance of the thicker sleeve to the dimensions of the core member. If however, a thin wall sleeve and particularly a sleeve within the recited thickness range is employed, it may be tightly fitted over the core member with no raised surface areas, to provide a surface which is nearly cylindrical as possible. The cylindricity of the mandrel not only controls the dimensions of the belt but in the event of an uncylindrical mandrel or one having non-uniform dimensions, the entire length of the belt becomes unusable in an imaging process because a resultant non-uniformity of the applied photoconductive material.

It is therefore an object of this invention to provide a new and improved mandrel structure which is of improved functionality insofar as the production of an endless, electroformed xerographic belt is concerned.

It is yet still another object of this invention to provide a cylindrical electroforming mandrel that is relatively easy and inexpensive to make and can be repaired easily if damaged.

SUMMARY OF THE INVENTION

According to the present invention, the ultimate objectives of producing an endless, seamless xerographic belt are achieved by electroforming an endless nickel belt on a cylindrically shaped mandrel having a passive surface in a nickel electroplating solution. The mandrel structures set forth in the present invention specifically include a hollow metal core member cylindrically shaped and made from a metal or combination of metals which exhibit a different coefficient of expansion than the deposited nickel belt. On the outer sleeve of the hollow core member, a thin metal sleeve is mounted which conforms to the dimension of the core member and has a thickness between about 10 to 60 mils. This thin metal sleeve which is tightly fitted over the core member provides a surface used for electrodeposition of the nickel belt. Depending on the metal used for the thin sleeve a coating of chromium may or may not be necessary to provide a passive surface for deposition of the nickel.

The mandrel with a removable but thin, metal sleeve has been found to be highly functional in the electroforming process for production of endless nickel xerographic belts and is particularly characterized by its low cost, easy fabrication, as well as its long life, which is especially due to the replaceable nature of the surface of the mandrel in the event of damage to it. Xerographic belts produced on the surface of these mandrels are of the highest quality and readily accept a photoconductive layer for use in a continuous electrostatic imaging process.

It should also be noted in the electroforming process, the nickel belt may be deposited on the outer surface of the mandrel in which case the mandrel used for deposition is referred to as a male mandrel, while if the inner surface is employed, the mandrel used for deposition is referred to as a female mandrel. It should be further recognized that the following description of the embodiments of the present invention is meant to apply only to a male mandrel and that for this reason the removable sleeve will be appropriately fitted over the hollow core member to produce an outer surface on the mandrel which is then suitable for electrodeposition of an endless nickel belt.

Other objects and various features of the invention will become apparent upon reading the following detailed description when considered together with the accompanying drawing and the parts designated thereon.

DESCRIPTION OF THE DRAWINGS

FIG. 1 is a view of the mandrel disclosed in the present invention, showing the removable sleeve.

DESCRIPTION OF THE PREFERRED EMBODIMENTS

Referring to the accompanying drawing, there is shown in FIG. 1 a view of a cylindrically shaped hollow male mandrel with a removable metal sleeve constructed according to the present invention and usable for the electroforming of an endless, seamless xerographic belt. The mandrel in FIG. 1 shows a core member 2 with an overlying metal sleeve 1 having a thickness between about 10 and 60 mils, which is shown partially removed from the mandrel core member. The inner surface of the male mandrel which will not be used for deposition and which is indicated as 3, may be coated with a suitable insulating material such as a silicone polymer, lacquer, teflon or vulcanized rubber. It is not intended that the present invention be limited by various dimensional features of the core member since dimensional features of the core member such as height and diameter would be entirely dependent on the size of the xerographic belt desired.

Furthermore, it is not intended that the thickness of the hollow core member be limiting since the thickness will be dependent on the choice of heat transfer rates during use, and on economic factors considered in fabrication of the core member. The core member itself may be further formed by various conventional metal manufacturing techniques such as by extrusion, forging or flat plate rolling and welding. Generally, after fabrication, it is customary to first machine grind or polish the surface of the core member followed by chemical cleaning thereof and treatment by a zincate process. It may be further desirable to apply a thin plate of nickel to the core member, since even though the sleeve of the instant invention has an interference fit, in the event the ends of the cylinder are not properly coated with the insulating material 3, seepage of the electroplating solution could occur between the sleeve and the core member through microscopic gaps which could exist. If a nickel plate exists on the core member it prevents a resultant buildup of corrosion products on the surface of the core member by the nickel electroplating solution, which if not prevented could raise the sleeve from the core member thus changing dimensions of the mandrel. The use of a plating on the core member is not however intended to be limiting insofar as the instant invention, since the problem can also be obviated by insuring that a sufficient coating of insulating material on the ends of the cylindrical mandrel prevents seepage of the electroplating solution between the sleeve and the core member.

The hollow core member is formed into a well defined cylindrical shape, as nearly a perfect cylinder as possible in order to insure accurate dimensions being imparted to the endless nickel belt which will be deposited on the surface of the completed mandrel. The metals utilized as the core member on the mandrel are not critical and may be selected from any metal or combination of metals which would exibit a different coefficient of expansion than both the thin walled sleeve and the deposited nickel belt, thus allowing easy mounting of the sleeve on the core member as well as easy removal of the deposited nickel belt. Typically, the core member will have a coefficient of expansion above $19 \times 10^{-8}$ inches/inch/°C.

Aluminum or aluminum alloys are the preferred metals for the core member in a male mandrel due to their somewhat higher coefficient of expansion than copper and stainless steel. Aluminum or its alloys also exhibit the desired heat transfer and heat capacity characteristics to reduce the time of heating and cooling the mandrel in the process of removing the endless nickel belt from the surface of the mandrel. Aluminum and its alloys also have the further advantage of being a metal of a lighter, more easily manageable weight. Suitable alloys of aluminum, although the following listing is not intended to be limiting, are Aluminum Alloys 6061, 2024 and 7075 as shown in Table 1 of ASTM Specification B209 for alloy sheet and plate.

The core member is then covered with a metal sleeve which is mounted on the core member, as for example by a shrink fitting process, and which conforms to the dimensions of the core member to provide a surface for electrodeposition of the nickel belt. The metal sleeve may be made from any metal, and the present invention is not intended to be limited in this respect. The particular metal employed however must be capable of being formed into a sleeve within the prescribed thickness range of 10 to 60 mils and have a sufficient yield strength within the recited thickness range to undergo stresses placed thereon by the thermally expanded core member in order to achieve an interference fit of the sleeve as well as thermal stresses placed on the sleeve during heating and cooling steps in the electroforming process itself. Preferred metals for the sleeve include nickel and stainless steel. Furthermore, depending on the metal selected for the sleeve it may or may not have a thin chromium coating on the outer surface of the sleeve which can be applied before or after the sleeve is mounted on the core member.

The sleeve can be mounted on the core member, preferably by a shrink fitting process involving thermal expansion of the sleeve and thermal contraction of the core member. The particular mounting process is not critical to the practice of the present invention and other means of mounting the sleeve may be employed.

The thin removable metal sleeve which is used in conjunction with the core member to produce the mandrel set out herein can be made by various metal manufacturing techniques depending on the metal used for the sleeve and it is not intended that the present invention be limited by the particular manufacturing process used for production of the sleeve as long as it will form a uniform sleeve of the recited thickness range.

If a nickel metal sleeve is made, it may also be produced by a electroforming process, by forming on the surface of a metal core member having a passive surface of chromium. It may also be made by an electroless or other plating process. After forming within the prescribed thickness range, it may be conveniently mounted on the core member following removal from the female master mandrel, spray cooling the nickel sleeve, and then slipping the nickel sleeve out from within the female master mandrel. The nickel sleeve is then mounted over the cylindrical core member. This can be preferably achieved by a shrink fitting process which involves heating the nickel sleeve, chilling the cylindrical core member, and then slipping the nickel sleeve over the cylindrical core member. After the nickel sleeve is mounted on the cylindrical aluminum forging, a thin layer of chromium may be deposited on its outer surface. Alternately, the layer of chromium can be deposited on the nickel sleeve before the nickel sleeve is mounted on the cylindrical aluminum forging. The layer of chromium may be deposited by electroplating or by other similar means.

If a stainless steel sleeve is desired for the mandrel within the thickness range set forth, it may be made by welding, milling or centrifugal casting depending on the choice. Sleeves of these metals which are suitable may also be formed by a roll extrusion process as described in U.S. Pat. No. 3,222,905.

Although the following is not intended to be a critical or limiting characteristic of the instant invention, depending on the metal chosen for the removable metal sleeve or the particular characteristics of the electroforming process, a chrome plating or coating over its outer surface may be necessary to provide a passive surface for the electroforming process. For example, while a stainless steel sleeve would be suitable as the mandrel surface without a chromium coating, a nickel sleeve may require a very thin chromium coating merely for the purpose of providing a passive surface for deposition of the nickel. A suitable range of thickness for the chromium layer would be between $100 \times 10^{-6}$ and $2000 \times 10^{-6}$ inches. It is necessary that the removable metal sleeve have a thickness between about 10 and 60 mils. Within this thickness range, it has been found that the sleeve will tightly fit on the core member to provide a suitable surface for deposition of the nickel belt, without detracting from the cylindricity of the core member as a thicker sleeve might, and yet has a good lifetime of use in a continuous electroforming process.

One of the principal advantages of the mandrel made according to this invention is that if the sleeve becomes damaged during use, it may be physically removed from the core member and simply replaced by another sleeve. In this manner a suitable surface for deposition of the nickel belt is maintained without complete replacement of the mandrel, including the core member. This reusability feature of the core member results in a complete mandrel which is more economical and yet is completely functional in an electroforming process for production of nickel belts suitable as xerographic substrates. The latter functionality in the electroforming process is of course attained by the very thin nature of the metal sleeve, i.e., between about 10 and 60 mils, since it fits tightly over the core member and because of its thin nature presents no dimensional problems when used together with the core member.

As previously noted, the metal sleeve may be physically or mechanically removed from the core member by any suitable techinque which does not damage the core member such as cutting, tearing, thermal expansion, etc. and the present invention is not intended to be limited in this respect. An easy means of removing the sleeve is by immersing the mandrel in liquid nitrogen and then slipping the metal sleeve off the core member as an intact member. Chemical means of removing the sleeve would not be desirable because of potential damage to the core member itself.

While the invention herein has been described in terms of specific embodiments, there is no desire to be limiting and it is thereby intended to cover the described invention within the appended claims and include all equivalents or modifications as may be reasonably included within their scope.

What is claimed is:

1. A method of making a cylindrically shaped, hollow, permanent mandrel suitable for surficial electrodeposition of a xerographic belt substrate of nickel comprising;
   a. providing a cylindrical, hollow metal core member,
   b. providing a metal sleeve having a thickness of between about 10 and 60 mils and consisting essentially of nickel,
   c. mounting said sleeve on said core member,
   d. coating the outer surface of said sleeve with chromium.

2. A method as set forth in claim 1 wherein said chromium coating is between about $100 \times 10^{-6}$ and $2000 \times 10^{-6}$ in thickness.

3. A method as set forth in claim 1 wherein said mounting step comprises shrink fitting of said sleeve over said core member.

4. A method as set forth in claim 1 wherein said core member consists essentially of a material selected from the group consisting of aluminum and aluminum alloys.

5. A method of making a cylindrically shaped, hollow permanent mandrel suitable for surficial electrodeposition of a xerographic belt substrate of nickel comprising;
   a. providing a cylindrical metal core member,
   b. providing a metal sleeve having a thickness of between about 10 and 60 mils, consisting essentially of a material selected from the group consisting of nickel and stainless steel, and having a chromium coating on at least one surface thereof,
   c. mounting said sleeve on said core member.

6. The method as set forth in claim 5 wherein said mounting step comprises shrink fitting of said sleeve over said core member.

7. The method of making a cylindrically shaped, hollow, permanent mandrel suitable for surficial electrodeposition of a xerographic belt substrate of nickel comprising;
   a providing a cylindrical core member consisting essentially of a material selected from the group consisting of aluminum and aluminum alloys,
   b providing a metal sleeve having a thickness between about 10 and 60 mils,
   c shrink-fitting said sleeve on said core member,
   wherein said sleeve consists essentially of nickel and which has a chromium coating on at least one surface thereof.

* * * * *